(12) United States Patent
Bai et al.

(10) Patent No.: US 10,481,407 B2
(45) Date of Patent: Nov. 19, 2019

(54) 3D GLASSES AND 3D DISPLAY SYSTEM

(71) Applicants: BOE Technology Group Co., Ltd., Beijing (CN); Beijing BOE Display Technology Co., Ltd., Beijing (CN)

(72) Inventors: Bing Bai, Beijing (CN); Inho Park, Beijing (CN); Weitao Chen, Beijing (CN); Hui Zheng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 68 days.

(21) Appl. No.: 15/923,377

(22) Filed: Mar. 16, 2018

(65) Prior Publication Data

US 2019/0049741 A1    Feb. 14, 2019

(30) Foreign Application Priority Data

Aug. 11, 2017   (CN) .......................... 2017 1 0690767

(51) Int. Cl.
G02B 27/26    (2006.01)
G02B 27/01    (2006.01)

(52) U.S. Cl.
CPC ......... *G02B 27/26* (2013.01); *G02B 27/0172* (2013.01); *G02B 2027/0134* (2013.01)

(58) Field of Classification Search
CPC ................ G02B 27/26; G02B 27/0172; G02B 2027/0134
See application file for complete search history.

(56) References Cited

U.S. PATENT DOCUMENTS

| | | | |
|---|---|---|---|
| 2010/0208041 | A1 | 8/2010 | Savvateev et al. |
| 2013/0222384 | A1 | 8/2013 | Futterer et al. |
| 2016/0329028 | A1 | 11/2016 | Simmons |

FOREIGN PATENT DOCUMENTS

| | | |
|---|---|---|
| CN | 102279467 A | 12/2011 |
| CN | 102317845 A | 1/2012 |

(Continued)

OTHER PUBLICATIONS

Yan, "3D (three-dimensional) display device and glasses matched with same", CN102798979, machine translation (Year: 2012).*

(Continued)

*Primary Examiner* — Wen Huang
(74) *Attorney, Agent, or Firm* — Fay Sharpe LLP

(57) ABSTRACT

A pair of 3D glasses and a 3D display system are disclosed in the field of display technology. The pair of 3D glasses includes a light polarizing component and a light filtering component. The light filtering component is arranged at the light emitting side of the light polarizing component. The light polarizing component includes a plurality of photonic crystals, each of which is configured to reflect preset-color light among different-color light incident into the photonic crystal to enable the preset-color light to be deflected so as to ensure an optical path difference among the different-color light incident into the light filtering component from the light polarizing component. The light filtering component includes two light filters, one of which is configured to filter out the preset-color light among the different-color light and the other of which is configured to filter out light other than the preset-color light among the different-color light. The present disclosure solves the problem of the relatively high cost of the 3D glasses and reduces the cost of the 3D glasses. The present disclosure is applied for 3D displaying.

20 Claims, 5 Drawing Sheets

(56) References Cited

FOREIGN PATENT DOCUMENTS

CN 102798979 A 11/2012
TW 201219829 A 5/2012

OTHER PUBLICATIONS

First Office Action of the prior Chinese application No. 201710690767.5 dated Mar. 4, 2019.

* cited by examiner

3D GLASSES AND 3D DISPLAY SYSTEM

This application claims priority to Chinese Patent Application No.: 201710690767.5, filed with the State Intellectual Property Office on Aug. 11, 2017 and titled "3D GLASSES AND 3D DISPLAY SYSTEM," the entire contents of which are incorporated herein by reference.

TECHNICAL FIELD

The present disclosure relates to display technology, and more particularly to a pair of 3D glasses and a 3D display system.

BACKGROUND

Three-dimensional (3D) images are more stereoscopic and vivid than two-dimensional (2D) images, and therefore can present viewers with an immersive feeling. At present, users view 3D images mainly through 3D glasses.

In the related art, a pair of 3D glasses comprises 3D lenses, a power supply component and a control component. The 3D lenses are generally liquid crystal lenses, and the control component is configured to control the power supply component to apply voltage onto the 3D lenses, so that the liquid crystal molecules in the liquid crystal layers of the 3D lenses deflect. Thus, light penetrates through the liquid crystal layers and exits from the 3D lenses.

During the process of implementing the present disclosure, at least following problems have been found in the related art: the 3D glasses in the related art comprise 3D lenses, a power supply component and a control component, and the power supply component needs to be controlled to apply voltage onto the 3D lenses. Therefore, the cost of the 3D glasses is relatively high.

SUMMARY

The present disclosure provides a pair of 3D glasses and a 3D display system. The technical solutions are as follows:

In a first aspect, there is provided a pair of 3D glasses. The 3D glasses include a light polarizing component and a light filtering component.

The light filtering component is arranged at the light emitting side the light polarizing component.

The light polarizing component includes a plurality of photonic crystals. Each of the photonic crystals is configured to reflect preset-color light among different-color light incident into the photonic crystal to enable the preset-color light to be deflected so as to ensure an optical path difference among the different-color light incident into the light filtering component from the light polarizing component.

The light filtering component includes two light filters. One of the two light filters is configured to filter out the preset-color light among the different-color light and the other one is configured to filter out light other than the preset-color light among the different-color light.

In some embodiments, the light polarizing component further includes a light transmission carrier. The plurality of photonic crystals are arranged in an array on the light transmission carrier, and an angle is formed between the surface of each of the photonic crystals and the bottom surface of the light transmission carrier.

In some embodiments, the bottom surface of the light transmission carrier is the light incident surface of the light polarizing component.

In some embodiments, the angle between the surface of each of the photonic crystals and the bottom surface of the light transmission carrier is 45 degrees.

In some embodiments, the different-color light includes light with three colors, and the preset-color light includes light with one or two colors among the light with three colors.

In some embodiments, the light with three colors includes red light, green light and blue light, and the preset-color light includes the green light and the blue light.

In some embodiments, the 3D glasses further include a diffuse reflection component arranged between the light polarizing component and the light filtering component and configured to reflect the different-color light emitted from the light polarizing component in a diffused manner.

In some embodiments, the diffuse reflection component is diffuse reflection glass.

In some embodiments, the 3D glasses further include a light converging component arranged between the diffuse reflection component and the light filtering component and configured to converge the different-color light incident into the light converging component from the diffuse reflection component.

In some embodiments, the light converging component includes two light convergers in a one-to-one correspondence with the two light filters. Each of the two light convergers is configured to converge the different-color light incident into the light converger from the diffuse reflection component.

In some embodiments, the 3D glasses further include a light blocking board. The two light convergers are located at different sides of the light blocking board, the two light filters are located at different sides of the light blocking board, and the light converger and the light filter, which are located at the same side of the light blocking board, correspond to each other.

In some embodiments, the light blocking board is perpendicular to the light incident surface of the light polarizing component.

In some embodiments, the 3D glasses further include a fastening component. The light polarizing component, the light filtering component, the diffuse reflection component, the light converging component and the light blocking board are all fixedly arranged on the fastening component.

In some embodiments, the light filter is a one-dimensional photonic crystal, and the light converger is a convex lens.

In some embodiments, each of the photonic crystals is a two-dimensional photonic crystal.

In some embodiments, the 3D glasses further include a wearing component connected with the fastening component.

In a second aspect, there is provided a 3D display system. The 3D display system includes a display device and a pair of 3D glasses described in any optional embodiment of the first aspect.

The display device is configured to display 2D images.

The pair of 3D glasses is configured to deflect the preset-color light among the different-color light incident into the 3D glasses from the display device and filter out preset-color light and the light other than the preset-color light among the different-color light respectively.

In some embodiments, the display device is an organic light-emitting diode display device or a liquid crystal display device.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
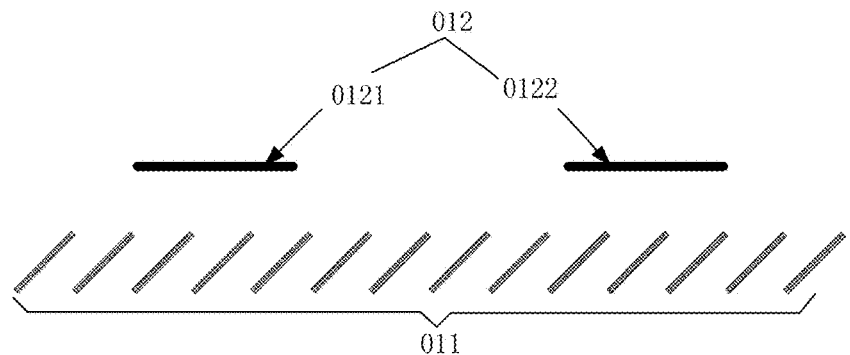
FIG. 1 is a structural diagram of a pair of 3D glasses provided in an embodiment of the present disclosure.

The drawings herein are incorporated in and constitute a part of this specification of the present disclosure, showing embodiments consistent with the present disclosure, and explaining the principles of the present disclosure together with the description.

DETAILED DESCRIPTION

The present disclosure will be described in further detail with reference to the enclosed drawings, to clearly present the objects, technique solutions, and advantages of the present disclosure. Apparently, the embodiments described here are merely some embodiments and are not representative of all embodiments consistent with the present disclosure. Based on the embodiments of the present disclosure, all other embodiments derived by a person of ordinary skill in the art without any creative efforts shall fall within the scope of the protection of the present disclosure.

3D images are more stereoscopic and vivid than 2D images and can present viewers with an immersive feeling. At present, 3D images are viewed mainly through the following four approaches:

the first approach: the 3D images are shot with a 3D camera and then processed and played back, so that viewers may view the 3D images with eyes;

the second approach: the 2D images are shot with a 2D camera and processed through a computer to be converted into 3D images, and the 3D images are played back, so that viewers may view the 3D images with eyes;

the third approach: incidence of a film source of the 2D images is controlled to convert the 2D images into the 3D images, and the 3D images are played back, so that viewers may view the 3D images with eyes; and the fourth approach: a special display device is used for deflecting the 2D images to form the 3D images so as to achieve a 3D effect.

However, among the above four approaches, the first approach and the second approach require that the display should have a 3D playback function, so the cost is relatively high; and the third approach and the fourth approach require that the display should have a 2D-3D conversion function (a function of converting 2D images into 3D images), so the cost is also relatively high.

With development of display technology, viewing 3D images through 3D glasses becomes a new approach for viewing the 3D images. In the related art, a 3D lens generally comprises a first substrate and a second substrate facing each other, as well as a liquid crystal layer disposed between the first substrate and the second substrate. A first electrode is arranged at the side, close to the liquid crystal layer, of the first substrate, and a second electrode is arranged at the side, close to the liquid crystal layer, of the second substrate. The first electrode and the second electrode are connected with a power supply component, and the power supply component is connected with a control component. The control component is configured to control the power supply component to apply voltage to both of the first electrode and the second electrode, so that liquid crystal molecules in the liquid crystal layer deflect to enable light to penetrate through the liquid crystal layer and to exit from the 3D lens. The control component is further configured to control the power supply component to switch the polarity of the voltage applied onto the first electrode and the second electrode, so that the light emitted from the 3D lens is deflected. Accordingly, there exists a difference between the light incident into the left eye and the light incident into the right eye, a difference exists between the time of viewing the left-eye images by the left eye and the time of viewing the right-eye images by the right eye, and the viewer's brain obtains the 3D images based on the left-eye images and the right-eye images. However, the cost of the existing 3D glasses is relatively high.

Refer to FIG. 1, which shows a structural diagram of a pair of 3D glasses 01 provided in the embodiments of the present disclosure. The pair of 3D glasses 01 comprises a light polarizing component 011 and a light filtering component 012.

The light filtering component 012 is arranged at the light emitting side of the light polarizing component 011. The light polarizing component 012 comprises a plurality of photonic crystals (not shown in FIG. 1). Each of the photonic crystals may reflect preset-color light among the different-color light incident into the photonic crystal to enable the preset-color light to be deflected and may also transmit light with other colors other than the preset-color light among the incident different-color light so as to ensure an optical path difference among the different-color light incident into the light filtering component 012 from the light polarizing component 011. The light filtering component 012 comprises two light filters which may be a light filter 0121 and a light filter 0122. One of the two light filters may filter out the preset-color light among the different-color light, and the other light filter may filter out light other than the preset-color light among the different-color light. For example, the light filter 0121 may filter the preset-color light among the different-color light, and the light filter 0122 may filter out light other than the preset-color light among the different-color light.

Filtering light with a certain color with the light filters may mean that the light filters filter out the light with the certain color, that is, the light filters prevent the light with the certain color from emitting.

To sum up, in the 3D glasses provided in the embodiment of the present disclosure, the light polarizing component may polarize the preset-color light among the different-color light incident into the light polarizing component, so that an optical path difference exists among the different-color light incident into the light filtering component. The light filtering component may filter out the different-color light incident into the light filtering component to ensure that the light incident into the left eye differs from the light incident into the right eye. Therefore, 3D images may be viewed by adopting the light polarizing component and the light filtering component, which solves the problem of the relatively high cost of the 3D glasses in the related art, and reduces the cost of the 3D glasses.

It should be noted that photonic crystals were put forward by S. John and E. Yablonovitch independently in 1987. Photonic crystals are micro-structures formed by periodic arrangement of materials with different refractive indexes, and are artificially designed and manufactured crystals with periodic dielectric structures in the aspect of material. Photonic crystals and semiconductor lattices have similar modulation to electron wave functions. Photonic crystals can modulate electromagnetic waves with certain wavelengths. When propagating in the photonic crystals, the electromagnetic waves may be modulated by the photonic crystals due to existence of Bragg scattering. The modulated electromagnetic waves may generate electromagnetic energy. The electromagnetic energy may form energy bands, and band gaps between the energy bands are known as photonic band gaps which may perform total reflection on light of a specific wave band, so that the light of the specific wave band is blocked. Photonic crystals can be divided into one-dimensional photonic crystals, two-dimensional photonic crystals and three-dimensional photonic crystals in accordance with the spatial dimensions. When the photonic crystals have periodic structures in one of the dimensions, the photonic band gaps only appear at the dimension. When the photonic crystals have periodic structures in all of the three dimensions, the photonic band gaps may appear at the three dimensions. These photonic crystals have all-directional photonic band gaps, and light with specific frequency cannot propagate after entering the photonic crystals.

In the embodiments of the present disclosure, the photonic band gaps of the photonic crystals in the light polarizing component 012 may comprise 505 nm-525 nm and 470 nm-505 nm. That is, the photonic crystals in the light polarizing component 012 may block light with the wavelength of 505 nm-525 nm and light with the wavelength of 470 nm-505 nm.

In some embodiments of the present disclosure, the different-color light incident into the photonic crystals comprises light with three colors, and the preset-color light comprises light with one or two colors among the light with the three colors. Furthermore, the light with the three colors comprises red light, green light and blue light, and the preset-color light comprises green light and blue light. The waveband range of the red light is generally 640 nm-780 nm, the waveband range of the blue light is generally 470 nm-505 nm, and the waveband range of the green light is generally 505 nm-525 nm.

Figure 2:
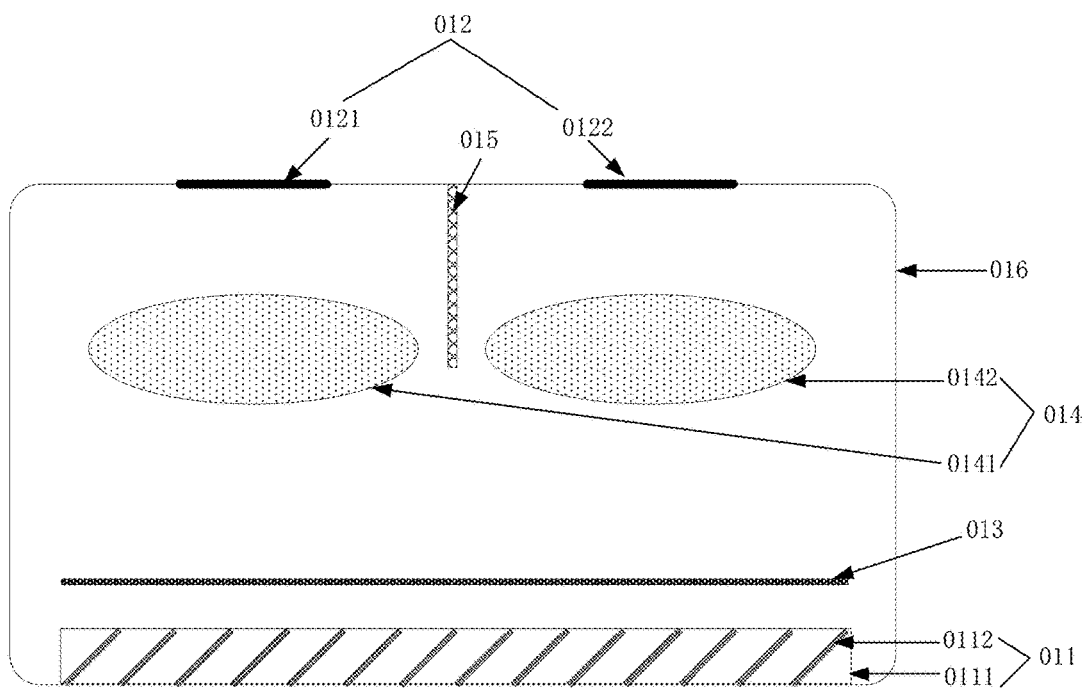
FIG. 2 is a structural diagram of another pair of 3D glasses provided in an embodiment of the present disclosure.
Figure 3:
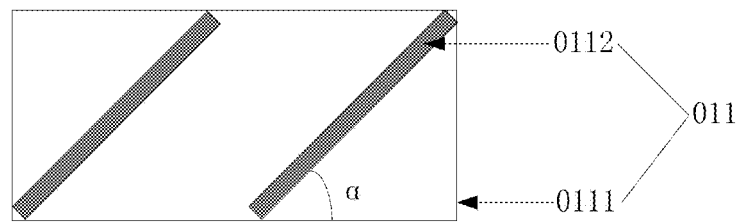
FIG. 3 is a local structural diagram of a light polarizing component provided in FIG. 2.

Furthermore, referring to FIG. 2, which shows a structural diagram of another pair of 3D glasses 01 provided in the embodiments of the present disclosure. FIG. 3 shows part of the structural diagram of the light polarizing component 011 in FIG. 2. With reference to FIG. 2 and FIG. 3, the light polarizing component 011 comprises a light transmission carrier 0111 and a plurality of photonic crystals 0112. The plurality of photonic crystals 0112 are arranged on the light transmission carrier 0111 in an array, and an angle α exists between the surface (not marked in FIG. 2 or FIG. 3) of each of the photonic crystals 0112 and the plane where the bottom surface (not marked in FIG. 2 or FIG. 3) of the light transmission carrier 0111 is located.

In some embodiments, the angle α between the surface of each of the photonic crystals 0112 and the plane where the bottom surface of the light transmission carrier 0111 is located is 45 degrees. In the embodiments, each photonic crystal 0112 may be a two-dimensional photonic crystal. The bottom surface of the light transmission carrier 011 may be parallel with the light incident surface of the light polarizing component 011. For example, the bottom surface of the light transmission carrier 0111 may be the light incident surface of the light polarizing component 011.

Furthermore, continue to refer to FIG. 2, on the basis of FIG. 1, the pair of 3D glasses 01 further comprises a diffuse reflection component 013 arranged between the light polarizing component 011 and the light filtering component 012. The diffuse reflection component 013 may reflect the different-color light emitted from the light polarizing component 011 in a diffused manner. In the embodiments of the present disclosure, the diffuse reflection component 013 may be diffuse reflection glass.

Furthermore, continue to refer to FIG. 2, the pair of 3D glasses 01 further comprises a light converging component 014 arranged between the diffuse reflection component 013 and the light filtering component 012. The light converging component 014 may converge the different-color light incident into the light converging component 014 from the diffuse reflection component 013. In some embodiments, as shown in FIG. 2, the light converging component 014 comprises two light convergers in a one-to-one correspondence with the two light filters of the light filtering component 012. Each of the two light convergers may converge the different-color light incident into the light converger from the diffuse reflection component 013 and input the converged light into the corresponding light filter. In the embodiments of the present disclosure, each light filter can be a one-dimensional photonic crystal, and the photonic band gaps of the two light filters are different. For example, the photonic band gaps of the light filter 0121 may be 505 nm-525 nm and 470 nm-505 nm, and the photonic band gap of the light filter 0122 may be 640 nm-780 nm. The light convergers may be convex lenses.

Exemplarily, as shown in FIG. 2, the light converging component 014 comprises a light converger 0141 and a light converger 0142. The light converger 0141 corresponds to the light filter 0121, and the light converger 0142 corresponds to the light filter 0122. Both of the light converger 0141 and the light converger 0142 can converge the different-color light incident into the light converger from the diffuse reflection component 013. Besides, the light converger 0141 can input the converged light into the light filter 0121, and the light converger 0142 can input the converged light into the light filter 0122.

Furthermore, please continue to refer to FIG. 2. The pair of 3D glasses 01 further comprises a light blocking board 015 and a fastening component 016. The two light convergers of the light converging component 014 are located at different sides of the light blocking board 015, the two light filters of the light filtering component 012 are located at different sides of the light blocking board 015, and the light converger and the light filter, which are located at the same side of the light blocking board 015, correspond to each other. For example, the light converger 0141 and the corresponding light filter 0121 are located at one side of the light blocking board 015, and the light converger 0142 and the corresponding light filter 0122 are located at the other side of the light blocking board 015.

As it can be seen from FIG. 2, the light blocking board 015 is perpendicular to the light incident surface of the light polarizing component 011. That is, the surface with the biggest area of the light blocking board 015 is perpendicular to the light incident surface, so that the light blocking board 015 may be configured to separate the light emitted from the two light convergers to guarantee that the light incident into the light filter 0121 and the light incident into the light filter 0122 are prevented from interference.

Besides, the light polarizing component 011, the light filtering component 012, the diffuse reflection component 013, the light converging component 014 and the light blocking board 015 are fixedly arranged on the fastening component 016.

It should be noted that in practice, the pair of 3D glasses further comprises a wearing component, a protecting component, and so forth. The wearing component is configured to allow a user to wear the 3D glasses, and the protecting component can protect the light filters, the light convergers, and the like in the 3D glasses. The 3D glasses provided in the embodiments of the present disclosure may realize the display of the 3D images through reflection, refraction, and so forth. The 3D glasses may be a device that may simply convert 2D images into 3D images to be viewed, and are particularly suitable for simple animation.

Figure 4:
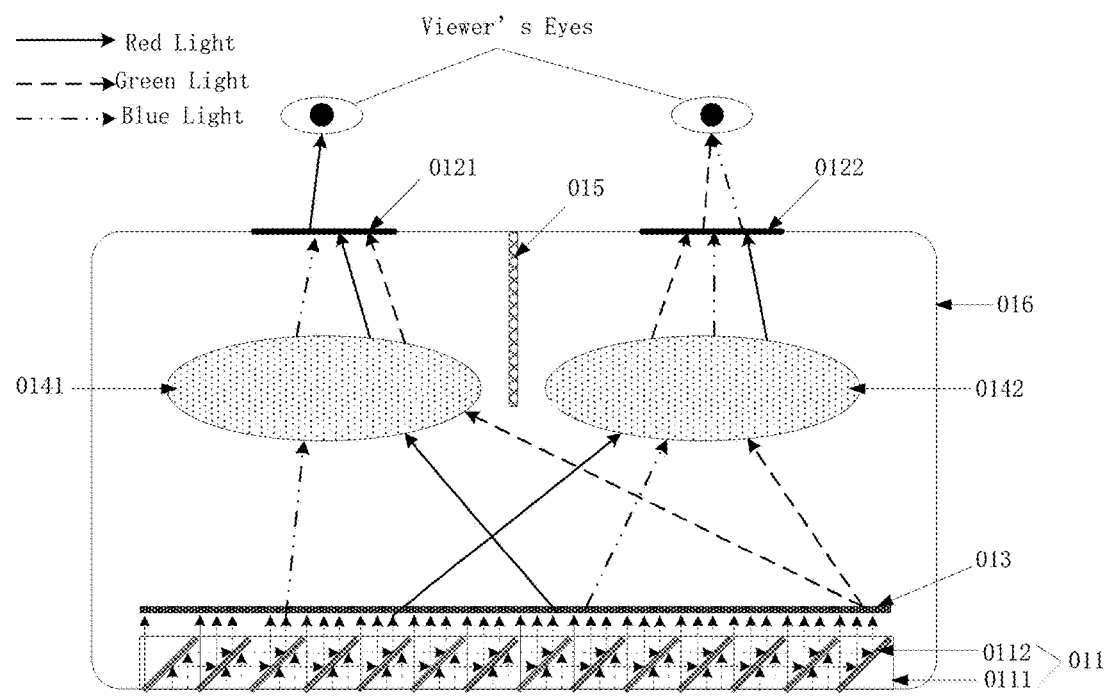
FIG. 4 is an application scenario diagram of a pair of 3D glasses provided in an embodiment of the present disclosure.
Figure 5:
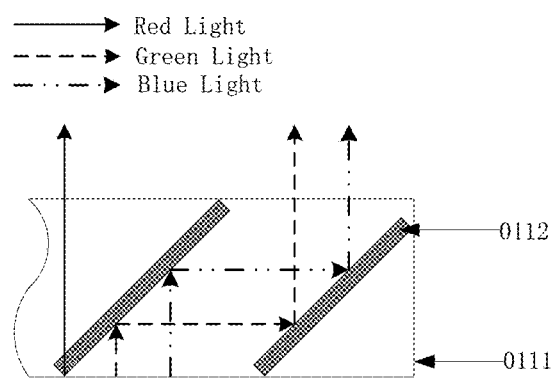
FIG. 5 is a local structural diagram of a pair of 3D glasses in the application scenario of FIG. 4.

With reference to FIG. 2, the application scenarios of the 3D glasses 01 provided in the embodiments of the present disclosure are explained as follows. FIG. 4 is an application scenario diagram of the 3D glasses 01 provided in the embodiments of the present disclosure. FIG. 5 is a local structural diagram of the 3D glasses in the application scenario as shown in FIG. 4. The present embodiment is described by taking an example in which the different-color light comprises light with three colors, namely red light, green light and blue light.

With reference to FIG. 2, FIG. 4 and FIG. 5, during the use of the 3D glasses 01, red light, green light and blue light is incident into the light transmission carrier 0111 and propagate toward the surfaces of the photonic crystals 0112. In the embodiments of the present disclosure, the photonic band gaps of the photonic crystals 0112 may be 505 nm-525 nm and 470 nm-505 nm, while the waveband range of the green light is 505 nm-525 nm, and the waveband range of the blue light is 470 nm-505 nm. Therefore, the photonic crystals 0112 can block the green light and the blue light, such that the green light and the blue light are repeatedly reflected on the surfaces of the photonic crystals 0112 and are finally emitted from the light polarizing component 011 while red light can penetrate through the photonic crystals 0112 to be directly emitted from the light polarizing component 011. Exemplarily, as shown in FIG. 5, the green light is reflected on the surfaces of two photonic crystals 0112 and then are emitted out.

After the emergent light is incident into the diffuse reflection component 013, the diffuse reflection component 013 reflects the light in a diffused manner such that the light diffuses all around. Then, the diffused light is incident into the light converging component 014, and the light converger 0141 and the light converger 0142 of the light converging component 014 can converge the light. Light converged by the light converger 0141 is incident into the light filter 0121, and light converged by the light converger 0142 is incident into the light filter 0122. The light filter 0121 can block green light and blue light among the light incident into the light filter 0121 and allow red light to pass through the light filter 0121, and the light filter 0122 can block red light among the light incident into the light filter 0122 and allow green light and blue light to pass through the light filter 0122. During this process, the light blocking board 015 separates light to guarantee that the light incident into the light filter 0121 and the light incident into the light filter 0122 are prevented from interference and to further guarantee that the light incident into the left eye and the light incident into the right eye are prevented from interference.

Figure 6:
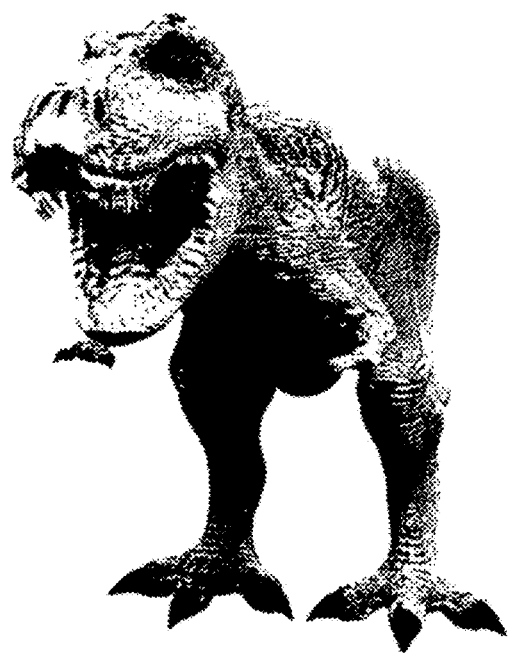
FIG. 6 is a diagram of a 3D image provided in an embodiment of the present disclosure.

Among the light incident into a viewer's eyes, the green light and the blue light are the light reflected by the photonic crystals 0112 of the light polarizing component 011, and the red light is the light not reflected. In addition, the green light and the blue light is incident into the right eye, and the red light is incident into the left eye (or, the green light and the blue light is incident into the left eye and the red light is incident into the right eye). Thus, an optical path difference exists between the light incident into the left eye and the light incident into the right eye, and a difference exists between the time of viewing the left-eye images by the left eye and the time of viewing the right-eye images by the right eye. In this case, the viewer's brain may obtain 3D images based on the left-eye images and the right-eye images. For example, the 3D images as shown in FIG. 6 may be obtained, and the 3D images shown in FIG. 6 may be simple 3D images.

To sum up, in the 3D glasses provided in the embodiment of the present disclosure, the light polarizing component may polarize the preset-color light among the different-color light incident into the light polarizing component, so that an optical path difference exists among the different-color light incident into the light filtering component. The light filtering component may filter out the different-color light incident into the light filtering component to ensure that the light incident into the left eye differs from the light incident into the right eye. Therefore, 3D images may be viewed by adopting the light polarizing component and the light filtering component, which solves the problem of the relatively high cost of the 3D glasses in the related art, and reduces the cost of the 3D glasses.

Figure 7:
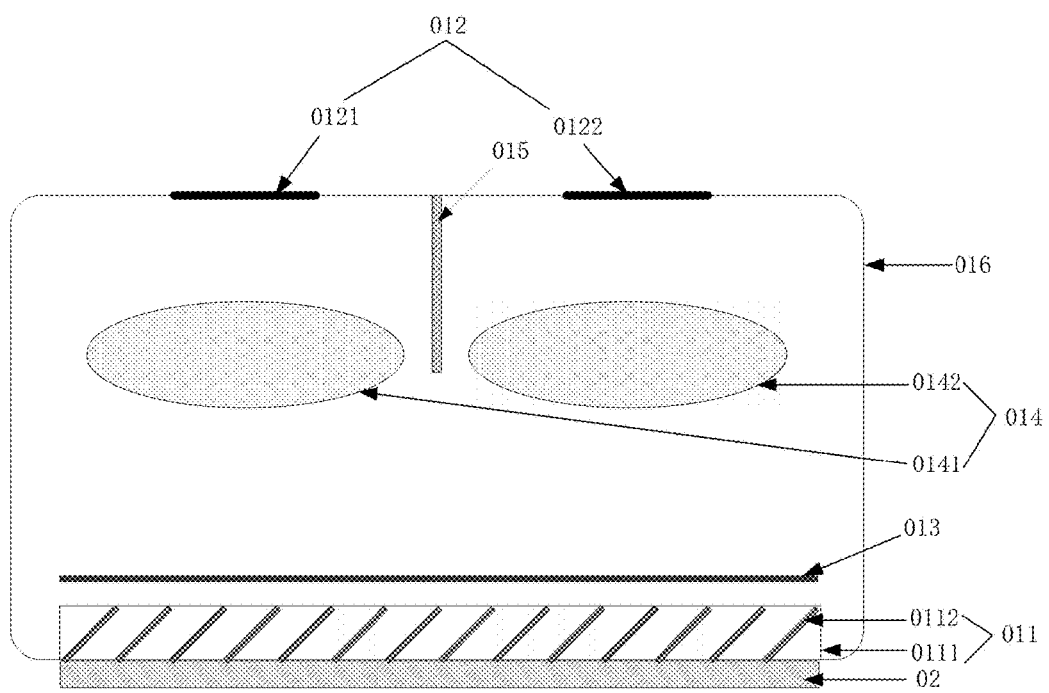
FIG. 7 is a structural diagram of a 3D display system provided in an embodiment of the present disclosure.

Referring to FIG. 7, which shows a structural diagram of a 3D display system provided in accordance with an embodiment of the present disclosure. Referring to FIG. 7, the 3D display system includes: a display device 02 and a pair of 3D glasses. The 3D glasses may the glasses as shown in FIG. 1 or FIG. 2.

The display device 02 may be an organic light-emitting diode (OLED) display device or a liquid crystal display (LCD) device. The display device 02 is configured to display 2D images.

The 3D glasses are configured to deflect the preset-color light among the different-color light incident into the 3D glasses from the display device 02 and to filter out the preset-color light and the light other than the preset-color light among the different-color light respectively, such that a viewer may view 3D images with 3D glasses.

It should be noted that in practice, the display device 02 may be a television, a computer, a mobile terminal or the like. FIG. 7 is drawn with the display device 02 being a mobile terminal. The process of displaying 2D images by the display device 02 may be made reference to the related art and the working principle of the 3D glasses may be made reference to the relevant description in FIG. 1 to FIG. 5, which is not repeated here.

To sum up, the 3D display system provided in the embodiment of the present disclosure includes a display device and a pair of 3D glasses. The light polarizing component of the 3D glasses may polarize the preset-color light among the different-color light incident into the light polarizing component, so that an optical path difference exists among the different-color light incident into the light filtering component. The light filtering component may filter out the different-color light incident into the light filtering component to ensure that the light incident into the left eye differs from the light incident into the right eye. Therefore, 3D images may be viewed by adopting the light polarizing component and the light filtering component, which solves the problem of the relatively high cost of the 3D glasses in the related art, and reduces the cost of the 3D glasses.

The foregoing are only some embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A pair of 3D glasses, comprising a light polarizing component and a light filtering component, wherein
the light filtering component is arranged at a light emitting side of the light polarizing component;
the light polarizing component comprises a plurality of photonic crystals, each of which is configured to reflect preset-color light among different-color light incident into the photonic crystal to enable the preset-color light to be deflected so as to ensure an optical path difference among the different-color light incident into the light filtering component from the light polarizing component; and
the light filtering component comprises two light filters, one of which is configured to filter out the preset-color light among the different-color light and the other of which is configured to filter out light other than the preset-color light among the different-color light.

2. The 3D glasses according to claim 1, wherein the light polarizing component further comprises a light transmission carrier on which the photonic crystals are arranged in an array, and an angle is formed between a surface of each of the photonic crystals and a bottom surface of the light transmission carrier.

3. The 3D glasses according to claim 2, wherein the angle between the surface of each of the photonic crystals and the bottom surface of the light transmission carrier is 45 degrees.

4. The 3D glasses according to claim 2, wherein the bottom surface of the light transmission carrier is an incident surface of the light polarizing component.

5. The 3D glasses according to claim 1, wherein the different-color light comprises light with three colors, and the preset-color light comprises light with one or two colors among the light with three colors.

6. The 3D glasses according to claim 5, wherein the light with three colors comprises red light, green light and blue light, and the preset-color light comprises the green light and the blue light.

7. The 3D glasses according to claim 1, further comprising a diffuse reflection component arranged between the light polarizing component and the light filtering component and configured to reflect the different-color light emitted from the light polarizing component in a diffused manner.

8. The 3D glasses according to claim 7, wherein the diffuse reflection component is diffuse reflection glass.

9. The 3D glasses as claimed in claim 1, further comprising a light converging component arranged between the light polarizing component and the light filtering component and configured to converge the exiting different-color light of the light polarizing component.

10. The 3D glasses according to claim 7, further comprising a light converging component arranged between the diffuse reflection component and the light filtering component and configured to converge the different-color light incident into the light converging component from the diffuse reflection component.

11. The 3D glasses according to claim 10, wherein the light converging component comprises two light convergers in a one-to-one correspondence with the two light filters, and each of the two light convergers is configured to converge the different-color light incident into the light converger from the diffuse reflection component.

12. The 3D glasses according to claim 11, further comprising a light blocking board, wherein the two light convergers are located at different sides of the light blocking board, the two light filters are located at different sides of the light blocking board, and the light converger and the light filter that are located at the same side of the light blocking board correspond to each other.

13. The 3D glasses according to claim 12, wherein the light blocking board is perpendicular to the incident surface of the light polarizing component.

14. The 3D glasses according to claim 12, further comprising a fastening component, wherein the light polarizing component, the light filtering component, the diffuse reflection component, the light converging component and the light blocking board are all fixedly arranged on the fastening component.

15. The 3D glasses according to claim 1, wherein each of the light filters is a one-dimensional photonic crystal.

16. The 3D glasses according to claim 1, wherein each of the photonic crystal is a two-dimensional photonic crystal.

17. The 3D glasses according to claim 11, wherein each of the light convergers is a convex lens.

18. The 3D glasses according to claim 14, further comprising a wearing component connected with the fastening component.

19. A 3D display system, comprising a display device and a pair of 3D glasses, wherein
the display device is configured to display 2D images; and
the pair of 3D glasses comprises a light polarizing component and a light filtering component arranged at a light emitting side of the light polarizing component;
the light polarizing component comprises a plurality of photonic crystals, each of which is configured to reflect preset-color light among different-color light incident into the photonic crystal from the display device to enable the preset-color light to be deflected so as to ensure an optical path difference among the different-color light incident into the light filtering component from the light polarizing component; and
the light filtering component comprises two light filters, one of which is configured to filter out the preset-color light among the different-color light and the other of which is configured to filter out light other than the preset-color light among the different-color light.

20. The 3D display system according to claim 19, wherein the display device is an organic light-emitting diode (OLED) display device or a liquid crystal display (LCD) device.

* * * * *